Aug. 7, 1962   H. J. SCHULTZ   3,048,034
ENGINE ANALYZER
Filed March 10, 1958   3 Sheets-Sheet 3

INVENTOR.
HENRY J. SCHULTZ
BY
Lippincott, Smith & Ralls
ATTORNEYS

United States Patent Office 3,048,034
Patented Aug. 7, 1962

3,048,034
ENGINE ANALYZER
Henry J. Schultz, Hayward, Calif., assignor to Brooks Walker, San Francisco, Calif.
Filed Mar. 10, 1958, Ser. No. 720,113
8 Claims. (Cl. 73—116)

This invention relates generally to engine analyzers adapted for the display of information concerning the operative functions of machines and engines, and more particularly, to engine analyzers which are mechanically directly coupled to the engine being analyzed to be synchronous therewith under all operational conditions.

The art of engine analysis becomes very important where irregularities in the performance and properties of an engine, such as an internal combustion engine, are to be quickly found and corrected. The most generally used engine analyzers display information of the operation of an engine on a cathode-ray tube, using as a time base a triggered sawtooth waveform in an internal combustion engine, usually triggered from a spark plug. The sweep circuits employed vary widely in amplitude, with the frequency, unless complex compensating circuits are added, and are seldom strictly linear. Few vary continuously between maximum and minimum engine speeds, and since the impulse for triggering them is usually derived from the ignition the datum for determining the epoch at which any event in the engine cycle occurs varies with the spark advance. The misfiring of a cylinder may prevent triggering from occurring at all.

It is therefore the principal object of this invention to provide an engine analyzer which overcomes the shortcomings set forth by providing a direct mechanical connection to the rotational output of the engine so that the engine analyzer will be synchronized with the rotational output of the engine at all times; thus changes occurring in, for instance, the r.p.m. of the engine will not affect the display of information on a cathode-ray tube concerning the operation of the engine under test.

It is a further object to provide an engine analyzer wherein a fixed differential phase relation between sawtooth waves developed by a potentiometer synchronously with the operation of an engine, and the rotational output of the engine can be selectively established. The sawtooth waves drive one of the deflection means on a cathode-ray tube to provide a sweep across the screen of said tube as a primary datum line while impulses derived from the operation of a selected function of the engine drive the other one of the deflection means on the cathode-ray tube whereby a visual representation of the timing of the selected function and the occurrence of events therein will be displayed relative to the datum line.

Other objects and advantages will become apparent from a consideration of the following detailed description taken in conjunction with the accompanying drawings, wherein.

Figure 1:
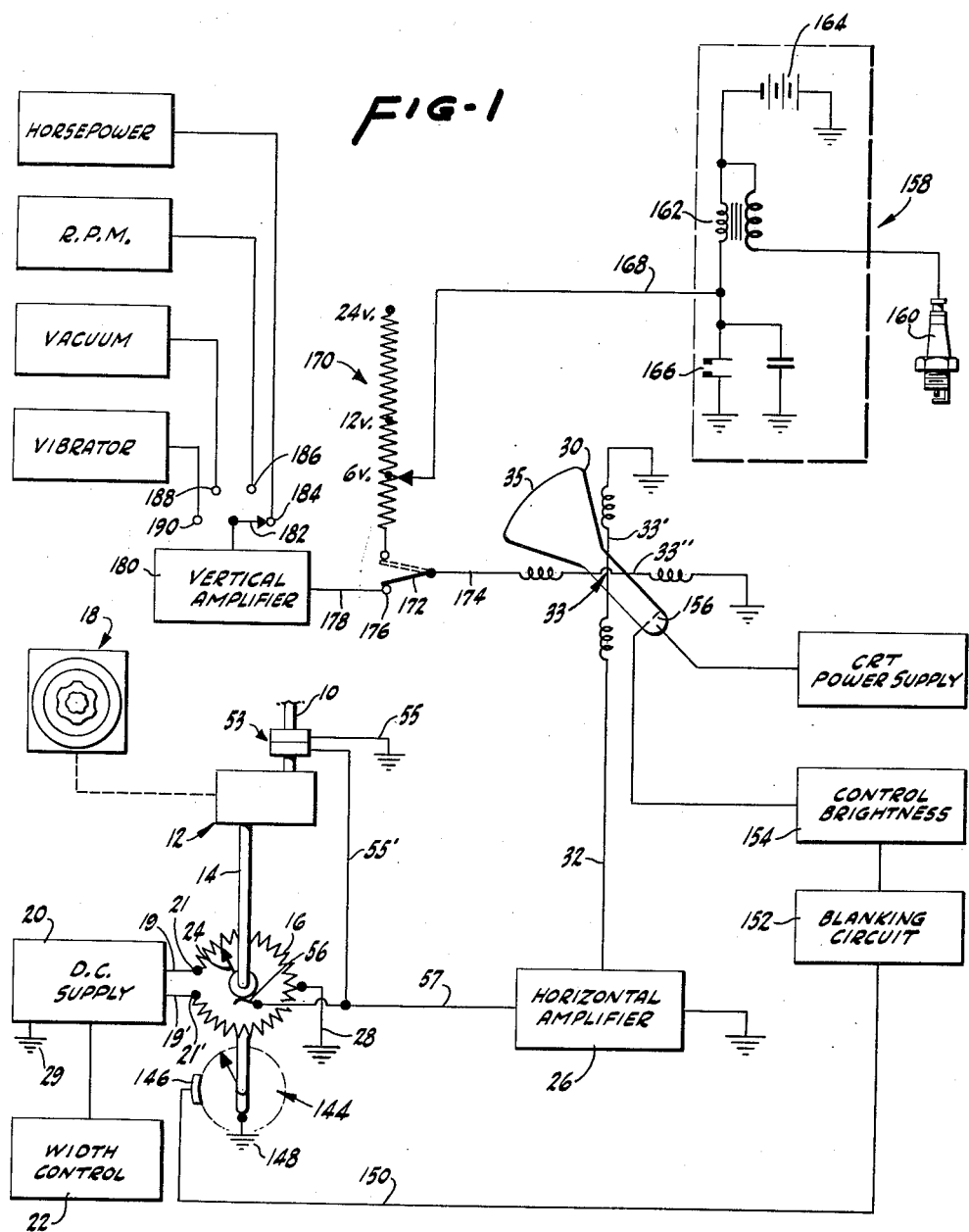
FIG. 1 is a view showing diagrammatically relationship of the various components of the engine analyzer embodying the present invention and their relation to each other and to the functions of motor to be analyzed.

With particular reference to the diagrammatic layout of FIG. 1, an input shaft 10 is adapted to be operatively connected to a mechanical takeoff preferably connected to the crankshaft of an engine or machine to be analyzed as by a flexible shaft, and to a motion transmission means provided by a train of gears, generally indicated at 12, which translates the engine r.p.m. to the cam r.p.m. in an output shaft 14 which in turn drives a sweep potentiometer generally indicated at 16 comprising a resistor and a relatively movable contact therewith, one of which is carried by the shaft 14 for synchronous rotation therewith. The position of the relatively movable contact or wiper 24 can be selectively set during operation by means of a calibrated control means, generally indicated at 18, for establishing a fixed differential phase relation between sawtooth waves developed by the potentiometer 16 and the rotational output of the machine or engine to be analyzed. Control 18 is operatively connected to the shaft 14 through the transmission means 12 so that the differential phase relation can be either preset at a primary datum position of angular departure for the rotational output of the engine or be set after operation has begun with the engine running and always will be synchronized with the sweep shown on a cathode-ray tube and the operation of the engine. Additionally, the control 18 permits calibration so that information can be obtained quickly and accurately. Although shown schematically, all of the component parts of the analyzer are housed within a suitable casing to present a compact appearance.

A source of direct current voltage supply 20, which may be a 24 volt battery to apply positive and negative voltages, through connections 19 and 19' respectively and terminals 21 and 21' respectively, across the resistor of the potentiometer 16. The amount of voltage applied can be selectively determined by operation of a control 22 connected to the source 20. The relatively movable contact defined by the wiper or brush 24 of the sweep potentiometer 16 is connected into a balanced D.C. complementary symmetrical type horizontal amplifier, generally indicated at 26. The sweep potentiometer is grounded through a lead 28, and the center of source 20 may be, if desired, grounded as at 29.

Horizontal amplifier 26 is connected through a lead 32 to the horizontal deflection means 33' of a deflection yoke 33 on a cathode-ray tube 30 to produce an electromagnetic deflection of the electrons emitted from the electron gun of tube 30 resulting in a substantially horizontal line appearing on the screen 35 of the tube in response to the sawtooth waves developed by the wiper of the sweep potentiometer. This horizontal line may be considered as a datum or base line reflecting the rotational output of the engine and synchronous therewith.

Figure 2:
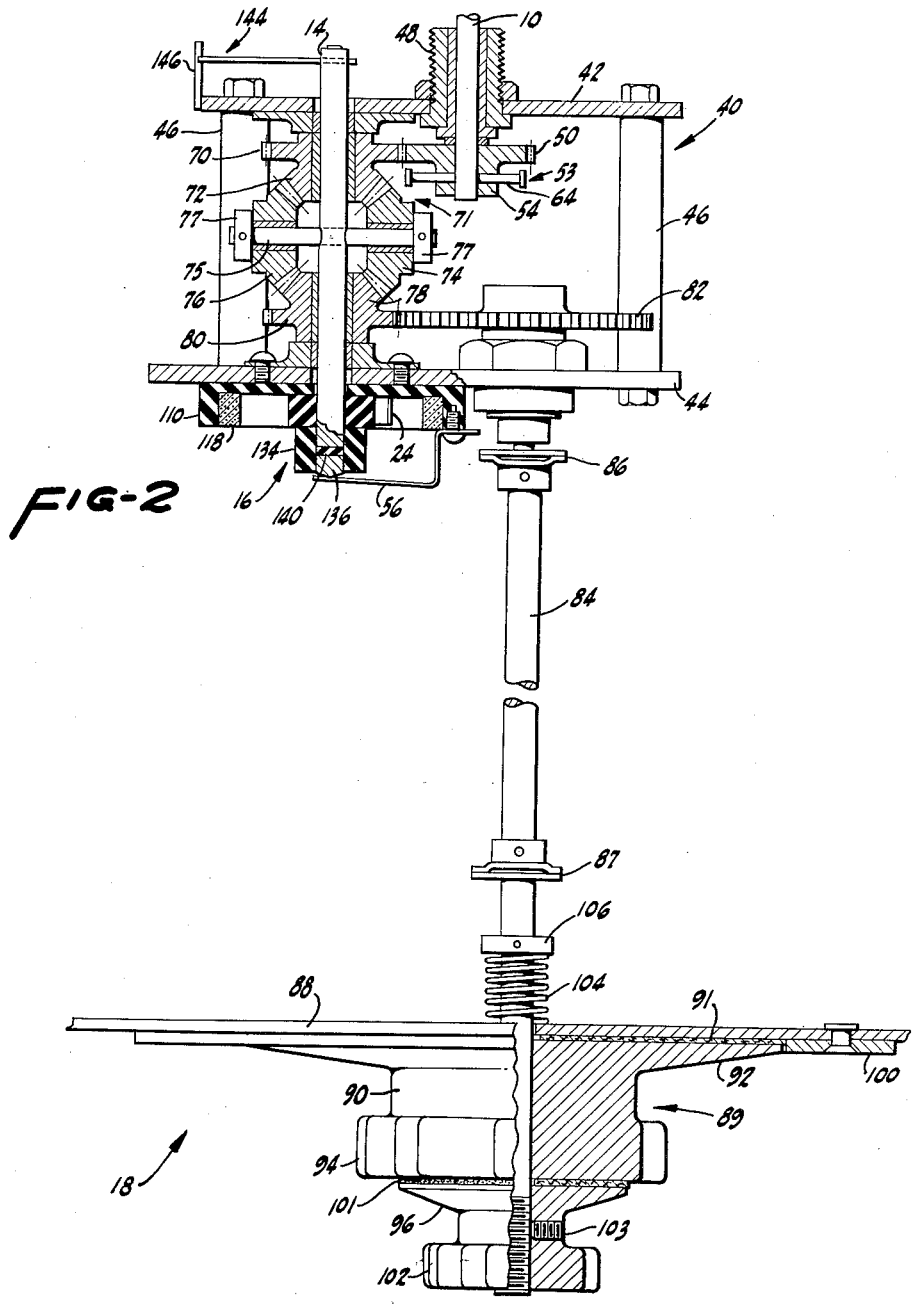
FIG. 2 is a plan view of the sweep box and the lag or lead correction control associated therewith with portions thereof broken away to show internal construction.

Referring specifically to the structure of the sweep potentiometer 16, gear train 12, and control 18, which alines the rotational output of the machine or engine with the electrical sweep of the potentiometer as differential phase relations, it will be seen in FIG. 2 that the operative connections between these components are made within a single unit or sweep box, generally indicated at 40. The sweep box 40 is of open construction, having spaced parallel generally rectangular plates 42 and 44 held in their spaced relation by spacing posts 46 arranged adjacent to the corners of the plates.

A bearing 48, supporting shaft 10, is externally threaded for connection to a flexible shaft housing or the like defining the direct or mechanical take-off of the engine to be analyzed, and is rotatably journalled in plate 42 to extend in a direction away from the lower plate 44. Within the box 40, shaft 10 carries a spur gear 50 for rotation therewith and secured thereto, as by a pin 64 extending laterally through the hub 54 of the gear 50. The hub carries thereon a speed responsive means in the form of a centrifugal switch, generally indicated at 53, for a purpose which will appear as the description proceeds. Switch 53 has one terminal 55" connected to lead 55 and spring 68, lead 55 is connected to a conducting member 56 which contacts the button 136 and wiper 24. Gear 50 drives shaft 14 through the motion transmission means 12 with sweep potentiometer 16 arranged about the free or lower end of the shaft 14.

Figures 4, 5:
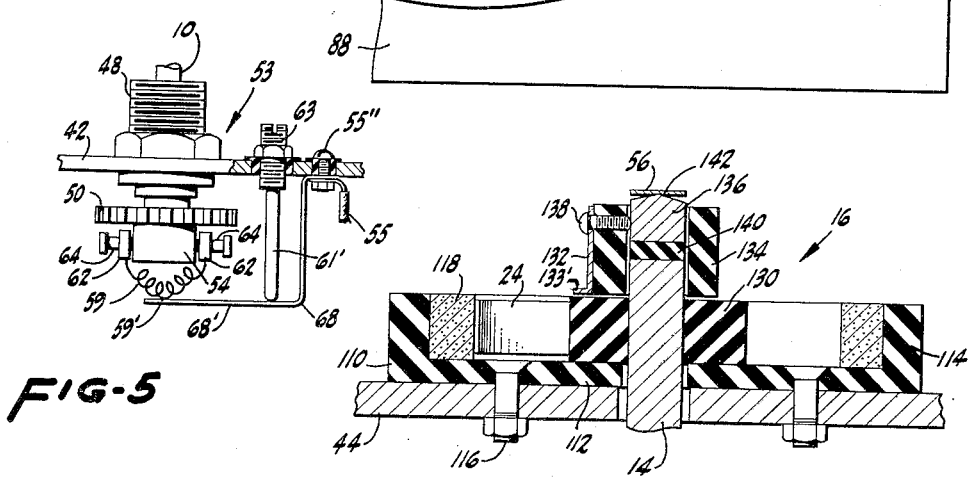
FIG. 4 is an enlarged cross-sectional view taken along line 4—4 of FIG. 3 and looking in the direction of the arrows.
FIG. 5 is an enlarged fragmeatary view of the centrifugal switch carried on the r.p.m. input shaft of the engine analyzer.

The centrifugal switch is constructed of a spirally wound wire 59 of generally V-shape, as best seen in FIG. 5 having its opposite free ends connected to weights 62 which are movable longitudinally along pins 64 carried by the hub 54 for rotation therewith. As the shaft 10 is rotating, the movable weights will move outwardly under the influence of the generated centrifugal force along the associated pins and draw the point 59' of the wire 59 away from a conductive member 68 so that there is no contact therebetween except at low rotation speed when there is a contact between point 59' and conductive spring 68. Horizontal amplifier 26 is grounded through lead 55, button 136, screw 138 and wiper 24 to ground out the horizontal amplifier 26 through lead 57.

The member 68 is a flat strip of electrically conductive material carried by the plate 42 and of substantially Z-shape with one leg secured by suitably electrically insulated terminal 55" to the plate 42 and the other leg extending toward the point of the wire 59'. Thus, as rotation of shaft 10 falls below a predeterminend value, such as zero r.p.m. (not rotating), the weights of the centrifugal switch will be located inwardly of the ends of pin 64 causing the point 59' of the spirally wound wire to project outwardly to contact the conductive member 68 so as to control the maximum horizontal deflection voltage which can be delivered to the cathode-ray tube 30, as by grounding the D.C. supply voltage which would otherwise flow into the horizontal amplifier 26. Thus, at zero r.p.m. or some other predetermined value, there is no sawtooth wave delivered from the potentiometer 16 to the cathode-ray tube. Adjustment of the switch 53 is obtained by turning adjusting screw 63 threadingly carried by and electrically insulated from plate 42 to extend therethrough so that its extended portion 61' will contact one leg 68' of the member 68. By moving adjusting screw 63 toward or away from leg 68' the distance between the point 59' of the V-shaped wire 59 and the leg 68' can be so set as to insure contact between the wire 59 and the leg 68' only when r.p.m. on the shaft 10 falls below the predetermined value.

The output shaft 14 is journalled in and extends through the plates 42 and 44 for rotation about its axis parallel to the axis of the shaft 10. Gear train 12, transmitting motion from shaft 10 to shaft 14, includes a spur gear 70 carried on shaft 14 for rotation about the axis of the shaft independently of shaft rotation. Gear 70 meshes with gear 50 to be driven thereby. An epicyclic bevel gear arrangement or train, generally indicated at 71, is provided in the gear train 12 and includes a bevelled gear 72 integrally formed with gear 70, and rotatable therewith about shaft 14, meshed with a pair of identical bevel gears 74 and 76 which are coaxially mounted on the axle 75 in spaced relation to each other and with their teeth in facing relationship. Thrust collars 77 may be provided at opposite ends of axle 75 to maintain gears 74, 76 on the axle. Axle 75 has its axis normal to and intersecting the axis of shaft 14 with the gears 74 and 76 free to rotate about the axle, and is fixed intermediate its ends and centrally between gears 74 and 76, to the shaft 14, extending therethrough as shown in FIG. 2.

Rotation is imparted to gears 74 and 76 by their meshing, at 180° intervals, with the gear 72. Another miter-bevelled gear 78 is carried on shaft 14 to be freely rotatable thereabout as an axis. Gear 78 is spaced from gear 72 and is in mesh with the gears 74 and 76 in the same manner as the meshing contact between gears 74, 76 and 72 but on the opposite side thereof. Integrally formed with bevel gear 78, and freely rotatable about shaft 14 as an axis, is a spur gear 80 located to the side of axle 75 away from gears 70 and 72. The foregoing gearing is the train, including the epicyclic gear train 71, which defines the motion transmission means whereby rotation from input shaft 10 can be imparted to output shaft 14 at 2:1 reduction in speed so that shaft 14 will rotate at cam r.p.m.

However, in order for rotation to be imparted to shaft 14 it is necessary that either the gear 72 or 80 be held stationary. With both gears 72 and 80 free to rotate about the shaft 14 as an axis, bevel gears 74 and 76 will merely rotate about shaft 75 as an axis and will not move circumferentially about the gears 72 and 78. Therefore, with, for instance, the gear 80 being held against rotation about shaft 14 as an axis, spur gears 74 and 76 will travel about the circumference of the gear 78 to thereby impart rotation to the shaft 14 through the connection between the axle 75 and the shaft 14 in response to the rotation imparted by spur gear 70.

To provide for the locking of gear 80 against rotation, a control rod or shaft 84, with its axis parallel to the axes of shafts 10 and 14, is journalled adjacent to one end in the plate 44 and fixedly carries thereon a spur gear 82 meshed with the gear 80. Gear 82 is of a diameter such that it will, when rotated by the shaft 84, move gear 80 in a 1:2 relation, i.e., one revolution of gear 82 resulting in two revolutions of gear 80. Thus, rod 84 serves as an input shaft with respect to the angular departure of output shaft 14 since rotation of rod 84 will, through gears 80 and 82, cause a proportional rotation of shaft 14.

A pair of spaced universal joints 86 and 87 are provided in the shaft 84, as shown in FIG. 2, to prevent a strain or unbalance due to misalinement of the shaft 84 between the sweep box 40 and a panel 88 of the casing in which the analyzer is housed.

The epicyclic gear train 71 that has been described in detail acts as a mechanical adder, wherein the angular displacement of the output shaft, from an initial, arbitrarily chosen position, is proportional to the algebraic sum of the angular displacement of the two input shafts 10 and 84 from the corresponding initial positions. In practice, some distinctive primary datum in the cycle of operations of the engine is selected—e.g., top dead center of cylinder No. 1 at the end of the compression stroke—to which other crankshaft angles throughout the 720 degree, 4-stroke cycle are referred. If input shaft 84 is so set that wiper 24 has just cleared the gap between the terminals of the potentiometer, with the crankshaft at this datum point, the sweep will start concurrently when the engine is running and the beam will travel across the display screen with an instantaneous linear displacement from its initial point of impact at the edge of the screen proportional to the angular displacement of the crankshaft from its own datum point.

By moving the position of the shaft 84, fixed increments, corresponding to its setting, can be added to and subtracted from the displacement of the output shaft as determined by the crankshaft rotation, thus setting up a secondary datum for convenience in analyzing the performance of the various cylinders. Thus, for example, the horizontal sweep of the cathode-ray beam may be made to coincide with the top dead-center of any of the cylinders of the engine, by setting off the proper angle on shaft 84. Alternatively, the vertical displacement of the cathode-ray beam that marks the occurrence of any event in the operation of the engine can be brought into coincidence with an index line on the display screen, and the angle of the crankshaft, with relation to either the primary or secondary datum, may be read directly from the dial with greater accuracy than it can be from estimating the position of the vertical deflection in relation to an index grid on the face of the cathode-ray tube.

The dial arrangement and calibration are adapted to facilitate both the selection of the primary datum and the secondary datum points from which various readings may be taken. To this end, shaft 84 carries thereon a dial arrangement, generally indicated at 89, which comprises a first large index dial 90 having an index flange 92 and a knob 94, and another smaller dial 96 having a knob 102 immediately adjacent thereto. An index 97 on the flange of the large dial 92 reads against either of two scales 98 and 99 inscribed upon a scale ring 100. The first scale 98 is graduated from zero to 720 degrees, corresponding to the crankshaft displacement angle, and the second scale 99 is graduated from zero to 360 degrees, corresponding to cam shaft displacement angle. The larger dial 90 being the one normally used in operation.

The knob 102 on the smaller dial 96 is used to set the primary datum when the apparatus is first connected to any individual engine. With the index set to zero or to any other angle which it is desired that the sweep start, and with the indexing line that is normally inscribed on the engine flywheel in its correspondingly appropriate position, knob 102 can be rotated to bring the wiper across the potentiometer terminals 21 and 21'. From that point on the setting to bring the secondary datum into corresponding position for any cylinder, or to measure the angular position of the crank and cam shaft, at the instant of any occurrence in the event in the operation of the engine is merely a matter of reading the setting of the index 97 on either the scale 98 or 99.

Between the upper face of the dial 90 and the lower face of the panel 88 there is inserted a felt friction washer 91, and a similar felt friction washer 101 placed between the knob 94 and the adjacent face of the dial 96. The set screw 103 fixedly secures the dial 96 on the shaft 84 so that the rotation imparted to the dial 96 will be reflected on the corresponding rotation of the shaft 84. The combined friction action of felt washers 91 and 101 will hold shaft 84 from undesired turning, and consequently prevent gear 82 from rotating thereby to keep the gear 84 from turning. This will allow gears 74, 76 to rotate about the axis of shaft 14 and impart rotation thereto.

A coil spring 104 surrounds the shaft 87 on the side of the panel 88 remote from the dials 90 and 96 with one end thereof seated upon the adjacent face of the panel 88. The other end of the spring 104 is seated against the adjacent face of a collar 106 carried by the shaft 84 for movement longitudinally thereof and fixed thereto in a selected position by a set screw. Thus, by moving the collar 106 toward or away from the panel 88 the desired degree of compression can be established upon the spring 104. This resilient pressure upon the face of the panel is transmitted evenly across the felt washers 91 and 101. The annular indexing ring 100 is secured upon the face of the panel 88 on the side thereof remote from the spring 104, by suitable fastening means, such as rivets. The periphery of the dial 90 at the free end of the index face 92 will fill the annular space of the index ring 100 so that the index face will be closely adjacent to and can be matched upon rotation against indices 98, 99 marked upon the scale ring 100.

Thus, it will be seen that when the dial 90 is rotated the dial 96 will rotate therewith, due to the frictional connection provided by the felt friction washer 101 and the resilient pressure of the spring 104, and impart this rotation to shaft 84. However, rotation of the dial 96, by turning smaller knob 102, can be accomplished without corresponding rotation of the large dial 90 because the area of frictional contact between the inner face of the dial 90 and the felt washer 91 is so much greater and larger in diameter than the contact area between the outer end of the knob 94 and the adjoining face of the dial 96 on the felt washer 101. This frictional differential along with the resilient pressure of the spring 104 will hold the large dial stationary while the small dial 96 is rotated, or dial 90 can be manually restrained while dial 96 is rotated. Hence, the rotation of the shaft 84 can be accomplished by the rotation of either of the knobs 94 or 102. This, in turn, will cause a corresponding rotation of the gear 82 about its longitudinal axis and transmit this rotation to the gear 80. Rotation of gear 80 will mechanically add into the sweep potentiometer 16 any given angle around its 360°, or subtract therefrom, depending upon the direction in which the gear 82 is rotated. Thus, any desired starting point for the sweep potentiometer can be achieved initially or can be varied during its operation.

In the construction of the sweep potentiometer (FIGS. 3 and 4) there is provided a circular holder cup 110, preferably of an electrically non-conductive material, having its base 112 secured to the plate 44 on the side thereof remote from the gear 80 and having its side wall 114 projecting outwardly from the plate 44. The base 112 is secured to the plate 44 by suitable fastening means, such as screws 116. About the inner perimeter of the side wall 114 there is provided the circularly annular resistor, such as carbon ring 118, having an outer circumference approximately equal to the inner circumference of the side wall and the height approximately equal to the height of the side wall 114 above the base 112.

Figure 3:
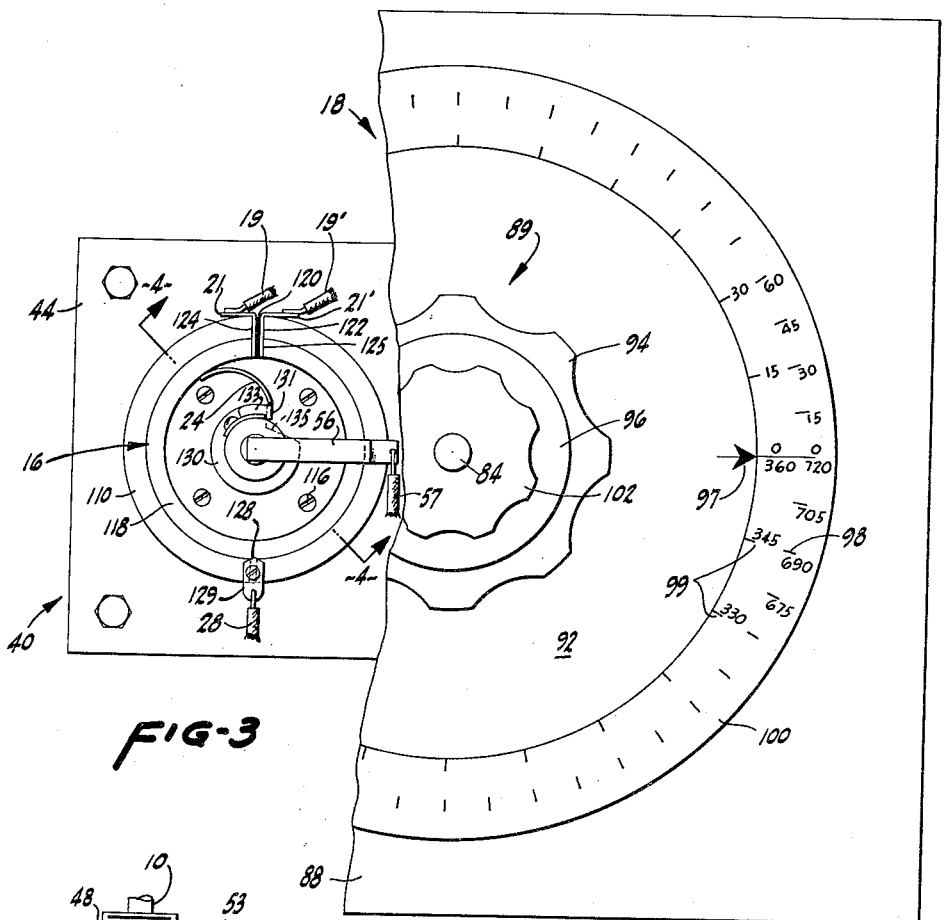
FIG. 3 is an elevational view looking upwardly from the bottom of FIG. 2, partially broken away for clarity of illustration.

With reference to FIG. 3, it will be seen that the side wall of the holder cup 110 and the carbon ring 118 is split as at 120 to define a space between the resulting end faces of the carbon ring which are coated with a conductive material such as colloidal silver. Conductive plates 122 and 124 are placed against respective end faces to extend radially of the carbon ring and provide laterally projecting contact ears defining the terminals 21 and 21' respectively, to which the D.C. voltage supply 20 may be connected through connections 19 and 19'. To separate the conductor plates 122 and 124, there is inserted therebetween a compressed piece of resilient insulating material 125 which has its inherent resiliency pressing against the plates 122 and 124 to urge them in constant contact with the respective silvered end faces of the carbon ring. The spacing 120 between faces 122 and 124 is shown in exaggerated proportion on the drawing for clarity of illustration. In practice, this spacing will be held to a very small dimension to minimize loss in the 360° sweep developed by the potentiometer 16 by wiper 24 travelling across the space 120. Diametrically opposite to the separation or split 120, the outside wall of carbon ring 118 is connected to ground by wire 28 to a terminal to define a center tap point 128 on the resistor or carbon ring 118. Center tap terminal wire 28 is connected to ground potential as at 29.

Thus, assuming for example, that the source of voltage is a 24 volt battery which through connections 19 and 19' will deliver +12 and −12 volts to terminals 21 and 21' respectively, then as the relatively rotatable contact, wiper 24, moves with relation to the resistor, carbon ring 118, there will be zero potential at the grounded, center tap point 128 and the maximum plus or minus voltage on the terminals 21 and 21' at the gap 120 which maximum amount is controlled by width control 22. Hence, the sawtooth wave developed by the potentiometer will be nearly linear on opposite sides of the resistor 118 from the center tap or zero point 128 and give a linear sweep across the screen of the cathode-ray tube as the potentiometer is rotated. To preserve linearity in the potentiometer, the impedance of the load must be kept high compared to the impedance of the potentiometer. Grounding the center of the source 20 contributes to linearity of the potentiometer by making the source potentiometer circuit symmetrical.

The wiper 24 is mounted on a carrier 130 carried on shaft 14 normally rotating in a clockwise direction as viewed in FIG. 3 so as to rotate therewith in a clockwise direction. As carrier 130 is caused to rotate, also in a clockwise direction as viewed in FIG. 3, a flexible, downwardly extending pawl element 133 formed on wiper 24 will engage in a shoulder 131 cut into the periphery of carrier 130 so that wiper 24 will brush along the inner circumference of the carbon ring 118. One end 132 of the wiper is secured upon the outer surface of an insulating cylindrical block 134 fixed to a metal plug 136, formed as an insulated extension of the end of shaft 14, by a screw 138 which passes through the wiper end 132, block 134, to bear against plug 136. This electrically connects wiper 24 to the plug 136 which is electrically insulated from and connected to shaft 14 by an insulator disc 140. For all practical considerations, plug 136 is a part of shaft 14 and rotates therewith. Metal plug 136 terminates in a point 142 against which the member 56 is resiliently urged by its inherent resilience. Thus, it will be apparent that the potential developed by the movable contact or wiper 24 will travel an equal distance across the resistor 118 on opposite sides of the center tap point 128 and develop equal potentials in opposite polarities so that the primary datum line will be established and will be maintained substantially constant throughout a wide range of speed variations of the rotational output of the machine to which shaft 14 is connected for synchronous rotation therewith.

To protect against reverse rotation, if for any reason shaft 14 is caused to rotate in the opposite (counterclockwise) direction, pawl element 133 will slide over, in ratchet fashion, the inclined cam portion 135 of the cutout portion of the carrier in ratchet fashion. Thus, wiper 24 will be prevented from rotating in a counterclockwise direction.

It is possible with minor modifications to rotate the potentiometer 16 relative to the shaft 14 instead of rotating the shaft 14 relative to the potentiometer 16, to provide relative rotation therebetween whereby the angular departure from a given datum position to establish selected secondary datum positions. In such case, the leads from the potentiometer would be flexible enough to allow approximately 360° rotation of the potentiometer about the axis of shaft 14. The shaft 14 could now be directly driven from the take-off of an engine to accomplish full orientation of the scope images relative to top dead center or duration of engine function. Calibration under this condition can be accomplished by providing an indexing means, similar to indexing means 89, on the plate 44 which would be rotatable about the axis of shaft 14.

Referring once again to the diagrammatic representation of FIG. 1, it will be seen that there is provided a blanking switch generally indicated at 144, secured upon the shaft 14 for rotation therewith. The blanking switch 144 is provided with a short segment 146 circumferentially thereof of an extent equal to the space between the plates 122 and 124, the spacing being exaggerated in Fig. 1. This will enable the blanking switch, which is grounded as at 148, to contact a lead 150 during the time the wiper 24 is passing across the gap between plates 122 and 124. Thus the conductive area of the blanking switch is so placed as to be conductive at the time the wiper is passing across the gap between the conductive plates 122 and 124. Lead 150 connects the blanking switch to the blanking circuit 152 which is coupled to a brightness control 154, connected to the control grid 156 of the cathode-ray tube 30 so that the fly-back of the horizontal datum line will be blanked on the face of the cathode-ray tube at the time the wiper 24 passes across the gap.

With continued reference to the diagrammatic illustration of FIG. 1, there is shown a portion 158 of an engine to be analyzed which includes a plurality of spark plugs, one such plug 160 being illustrated as an example. The spark plug 160, as well as all the other spark plugs of the engine, will be connected into an ignition coil 162 which is in turn connected, in the usual manner, between a source of electrical energy, such as battery 164, and breaker points 166 of a spark distributor. A conductive line 168 connects the ignition coil and breaker points into a voltage divider network generally indicated at 170 so that the particular voltage appropriate to the battery 164 employed in connection with the engine to be analyzed can be set along the divider network.

A switch 172 selectively connects the voltage of the divider network 170 into a lead 174 which is connected to the vertical deflection portion of the deflection yoke 33. This will allow a vertical pattern to be graphically portrayed upon the screen 35 of the cathode-ray tube when the engine is running, with the vertical pattern representing the action of the spark plugs and the breaker points of the distributor in the firing order of the engine. Since the input shaft 10 is directly connected by mechanical means to the crankshaft of the motor, the vertical pattern displayed by the operation of the spark plugs, ignition coil and breaker points of the engine will be synchronous with the horizontal datum line appearing on the face of the cathode-ray tube regardless of the speed or r.p.m. at which the engine is operated.

Thus, as hereinbefore explained, the horizontal beam of the cathode-ray tube is directly coupled through the sweep potentiometer 16 to the rotational output of the engine to be analyzed by a mechanical connection. The motion transmission means in the form of the train of gears 12 converts the crankshaft input to a cam shaft equivalent output in the shaft 14. The waveform developed by operation of the ignition circuit of the engine to drive the vertical deflection means 33'' to appear upon the screen of the cathode-ray tube as a vertical sawtooth waveformed superimposed on the horizontal sweep and will be seen in relation to the horizontal sweep with its position therealong linearly proportional to the rotation output of the engine, and be synchronous therewith, regardless of the speed at which the engine operates. A reading of the waveform generated by the operation of the plugs, such as plug 160, on the cathode-ray tube in reference to the datum line provided by the horizontal beam, will enable a comparison of the operation of the respective cylinders in their respective firing order. If one or more of the vertical deflections, each representing the conditions found in one of the respective cylinders in the firing order of the internal combustion engine analyzed, appears to be unorthodox or irregular by comparison with the patterns of the other cylinders, there will be a clear indication of which cylinder is producing the irregular pattern so that this source of irregularity in the engine can be quickly and accurately traced and located. It is further possible to adjust the datum line so as to bring the irregular or unorthodox pattern, if one appears, to a desired position or location along the horizontal datum line, and then expand the sweep so that the unorthodox or irregular pattern will correspond to a 45° sweep of the potentiometer by increasing the voltage applied from source 20 by selectively operating control 22 which serves as a horizontal sweep width control element. Hence, the pattern will be enlarged and may be studied in greater detail to get information as to the source of the irregularity in the ignition system with regard to the timing, spark intensity, duration, etc.

By moving the switch from its broken line position of FIG. 1 where it is connecting the divider network 170 to the cathode-ray tube, to the solid line of position where it connects onto a terminal 176 of a lead 178 from a vertical amplifier 180, and by using the selective switch 182 to connect into lead terminals 184, 186, 188, 190 from the usual type of apparatus indicative of the horsepower, r.p.m., vacuum and vibration of the engine, respectively, these engine characteristics will be transmitted through the vertical amplifier to switch 172 into the vertical deflection means of the deflection yoke 33 of cathode-ray tube 30 to appear on the screen of the tube as vertical deflections in synchronization with the operation of the engine, the amplitudes of these deflections corresponding to the magnitudes of the various quantities indicated. A grid or scale can be applied to the face of the cathode-ray tube and so calibrated that these quantities can be read directly in the customary units. As in the case of the ignition, any desired portion of the cycle can be enlarged by adjustment of width control 22 and phase control 18.

Considering once again the construction and structure of the gear train 12 and phase control 18, and for purposes of the following explanation, the shaft 10 and the shaft 84 act as first and second input shafts whose angular departure positions together determine the angular departure position of output shaft 14 which drives wiper 24 of the sweep potentiometer 16. Thus, it will be seen that the indexing means defined by the indexing dials 90 and 96, rotatable with respect to the angular index scale 100, will impart rotation to the shaft 84 to initially set the angular position of the output shaft 14 at a desired value through the interaction of gears 82 and 80. This angular departure is measured on the index scale. The dual index markings 97, 98 on the scale 100 is desirable since a single revolution of gear 82 will result in two revolutions of gear 80, either the angular departure from a fixed setting can be read in terms of the input shaft 10 which corresponds to the crank shaft displacement angle, or in terms of the output shaft 14 which corresponds to the cam shaft displacement angle.

It will be apparent from the foregoing that the initial setting of the angular departure of output shaft 14 will be proportional to the algebraic sum of the angular departures of the input shafts 10 and 84. The initial setting may be considered as a primary datum position. The indexing means 89 may then be employed to set an angular departure into the input shaft 84 any desired value relative to the primary datum position, to establish a secondary datum position which will add algebraically a constant angle of departure of output shaft 14 to the angle of departure imparted thereto by the rotation of the input shaft 10. The angular departures establishing primary and secondary datum positions will always be synchronous with the operation of the engine to be tested because shaft 10 is connected directly to the output of the engine. This, in effect, will establish a fixed differential phase of rotation between the waves developed by the potentiometer and the rotational output of the machine or engine under test.

It will be apparent from the foregoing that there has been provided an engine analyzer to be used in conjunction with a machine having a rotational output by the operative connection of a rotatable shaft directly coupled to the rotational output of the machine so as to synchronize therewith. The analyzer also includes a potentiometer having a circular resistor and a relatively movable contact therewith, one of which is carried by the shaft for synchronous rotation therewith. A source of D.C. voltage is connected to apply a voltage across the resistor, and connections are provided to the movable contact and to the source so that sawtooth waves are developed by the potentiometer upon rotation of the shaft to drive, through an amplifier, one of the deflection means on a cathode-ray tube to provide a sweep on the screen of the tube as a primary datum or reference line synchronous with the rotational output of the machine. A source of impulses is derived from a selected operational function of the machine to drive the other deflection means so that the cathode-ray tube screen will visually display a showing of the timing of various occurrences and events of the selected function during operation of the machine in relation to the datum or reference line.

More specifically, the engine analyzer includes a gear train having two input shafts 10 and 84 and an output shaft 14, the angular departure of which from the primary datum position is proportional to the algebraic sum of the angular departures of the two input shafts from corresponding primary datum positions. Indexing means 89 operatively engages one of the input shafts 84 for setting the angular position of this shaft at a desired value to establish a secondary datum position to add algebraically a constant angle of departure of output shaft 14 to that imparted thereto by rotation of input shaft 10. Any selected angular departure of the output shaft 14 can be portrayed upon the screen of the cathode-ray tube while the engine to be tested is running, and the datum so established will always be synchronous with the engine operation. Thus, the vertical deflections generated by the ignition system, or any other selected function of the engine, will appear on the screen of the cathode-ray tube in synchronous relation to the engine and be read upon the established datum line of the output shaft 14 throughout the entire speed range of the engine under test.

Although the analyzer has been described in connection with an internal combustion engine it will be apparent that the analyzer can be used in connection with other types of machines in which there is either horsepower developed, a vacuum used, vibration resulting from operation, an electrical ignition system involved, etc. Thus, a piece of machinery, such as a drill press or a milling machine, can be analyzed for any of the listed functions it possesses with the device of this invention, and the function analyzed will always be synchronous with the operation of the machine.

Where the machine to be tested is not provided with a cam shaft, the rotational output of the machine can be coupled directly to the shaft 14 so that shaft 14 will rotate synchronously with the rotational output of the machine. In such case, the gear 50 will be an idler gear driven off gear 70. The centrifugal switch 53 would continue to operate in the manner hereinbefore described. Where the shaft 14 is directly driven, the 720° scale of the indexing means can be conveniently employed.

What is claimed is:

1. An analyzer for a machine to be tested having a mechanical take-off drive synchronous with its operation, comprising a sweep potentiometer for translating the motion of the mechanical drive into an electrical waveform, a power supply connected across said potentiometer, a gear train operatively connected between said drive and said potentiometer to drive the latter in response to rotational motion of said drive, said gear train comprising first and second input shafts and an output shaft the angular departure of which from a primary datum position is proportional to the sum of the angular departures of said input shafts from corresponding primary datum positions, indexing means connected to the first of said input shafts for setting the angular position thereof at a desired value to establish a secondary datum position to add algebraically a constant angle of departure to said output to that imparted therteo by rotation of said second input shaft, a cathode-ray tube having a screen and pairs of deflection means, means coupling said potentiometer to one pair of deflection means of said tube to visually display the datum position of said output shaft as a horizontal datum line on the screen of said cathode-ray tube, and centrifugal switch means mounted for rotation by said take-off drive and connected in circuit with said sweep potentiometer for limiting voltage to said tube at engine rotation below a preselected value.

2. In combination with a machine to be tested having a take-off synchronous with its operation, an analyzer comprising a rotatable shaft adapted for operative connection to said take-off to be driven thereby so as to rotate synchronously therewith, a potentiometer comprising a circular resistor and a relatively movable contact carried by said shaft for synchronous rotation therewith, said resistor having a constant potential terminal, a source connected to apply a voltage across said resistor, connections to said movable contact and to said constant potential terminal of said resistor across which sawtooth waves of invariable length are developed upon rotation of said shaft, a cathode-ray tube having a screen and a horizontal and a vertical deflection means, means connecting said potentiometer at said movable contact and constant potential terminal to one of said deflection means to provide a sweep on the screen of said cathode-ray tube as a primary datum line synchronous with the operation of said machine, phase control means for selectively applying variable increments of rotation to said movable contact so as to insert a secondary variable phase difference to modify the initial fixed phase relationship between sawtooth waves from said potentiometer and the rotational output cycle of said machine, a source of impulses derived from the operation of said machine connected to drive said other deflection means, whereby a display is provided on said screen showing the timing of various events occurring during the operation of said machine relative to said datum line.

3. The analyzer as set out in claim 2 wherein there is provided a calibrated indexing means carried by said phase control means to indicate said fixed phase relation as a zero location and to indicate said secondary variable phase difference in angular degrees of magnitude thereof with respect to said zero location.

4. The analyzer as set out in claim 2 wherein there is provided speed responsive switch means connected to the rotational output of said machine and connected between the potentiometer and cathode-ray tube to divert from said cathode-ray tube substantially all voltage from said potentiometer when said machine take-off rotation falls below a predetermined value.

5. The analyzer as set out in claim 2 wherein said circular resistor is provided with terminals at the ends thereof and a center tap, connections electrically grounding said center tap, direct electrical connections from said terminals to said source, a connection between said relatively movable contact and one horizontal deflection terminal of said cathode-ray tube, and means electrically grounding the other horizontal deflection terminal of said cathode-ray tube, whereby said sawtooth wave being developed by the travel of said movable contact between said terminals and said center tap applies full deflection voltage to said tube in all phase relations of sawtooth wave and machine.

6. In combination with a machine to be tested having a rotational output synchronous with its operation, an analyzer comprising a rotatable shaft adapted for direct operative connection with said rotational output to be driven thereby so as to rotate synchronously therewith, phase control means connecting said rotatable shaft and machine for indexed phase adujstment of shaft rotation with respect to the rotation output of said machine, a potentiometer comprising a circular resistor and a relatively movable contact therewith one of which is carried by said shaft for synchronous rotation therewith, a source being connected to apply a voltage across said resistor, connections to said relatively movable contact and said source across which sawtooth waves are developed upon rotation of said shaft, a cathode-ray tube having a screen and a horizontal and a vertical deflection means, said potentiometer being connected to drive one of said deflection means to provide a sweep on the screen of said cathode-ray tube as a primary datum line synchronous with the rotational output of said machine, a source of impulses derived from the operation of said machine connected to drive said other deflection means whereby a display is provided on said screen showing various events occurring during the operation of said machine relative to said datum line.

7. The analyzer as set out in claim 6 wherein said circular resistor is provided with terminals thereon and with a center tap connecting thereto and to ground potential, said connections to said relatively movable contact and said source comprising direct connections from said terminals to said source, and a connection to said relatively movable contact and the center tap, said sawtooth wave being developed by the travel of said movable contact between said terminals and said center tap, equal amounts of potential of opposite polarity developed on opposite sides of said center tap to and from respective terminals being equal with said movable contact traveling through equal distances on opposite sides of said center tap whereby the width of said primary datum line across the screen of the cathode ray will be maintained substantially constant throughout a wide range of speeds of said rotational output without additional compensation for such speed variations.

8. An analyzer as set forth in claim 3, further defined by said control means having a control shaft; and said calibrated indexing means including a first index dial about said shaft and secured thereto for rotation of the shaft to establish a primary datum position, a second index dial about said shaft and frictionally engaging a stationary member and said first index dial, the frictional engagement of said second index dial with said fixed member being greater than the frictional engagement with said first index dial whereby rotation of said first index dial will not rotate said second index dial and rotation of said second index dial will rotate said first index dial and attached control shaft, and an index ring about said second index dial for indicating with said second dial the phase difference between sawtooth waves and machine rotation, as is established by said phase control means.

References Cited in the file of this patent

UNITED STATES PATENTS

| | | |
|---|---|---|
| 2,432,168 | Morgan et al. | Dec. 9, 1947 |
| 2,513,816 | Patterson et al. | July 4, 1950 |
| 2,575,494 | Hornfeck | Nov. 20, 1951 |
| 2,787,760 | Sammis et al. | Apr. 2, 1957 |
| 2,842,956 | Uyehard et al. | July 15, 1958 |